W. P. & H. T. MESSICK.
Improvement in Churns.
No. 131,623.
Patented Sep. 24, 1872.
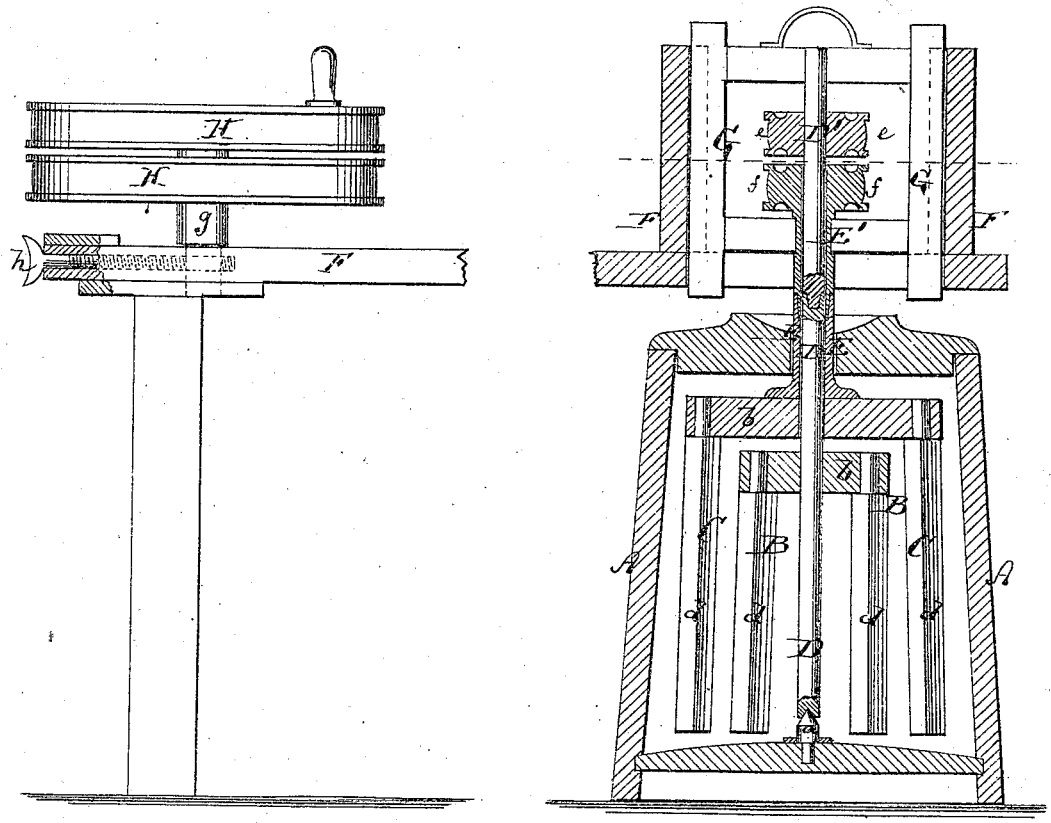
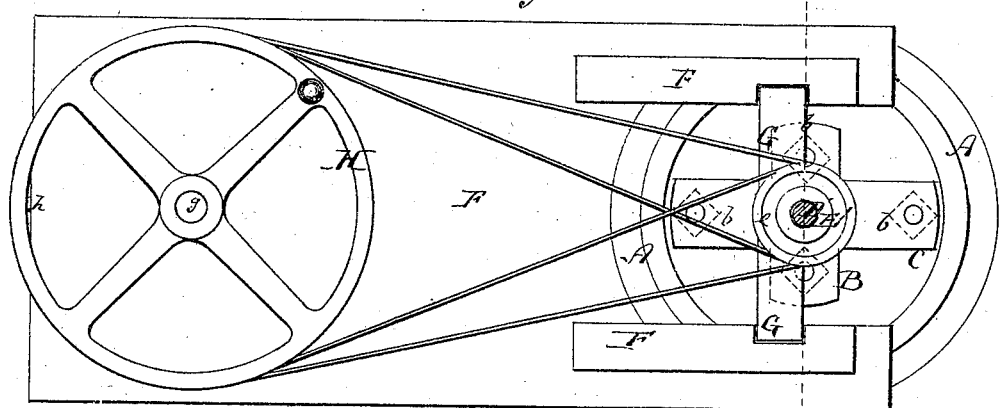
Witnesses:
E. Wolff.
C. Sedgwick.
Inventor:
W. P. and H. T. Messick
per Munn & Co.
Attorneys.

UNITED STATES PATENT OFFICE.

WILLIAM P. MESSICK AND HARVEY T. MESSICK, OF CLARKSVILLE, TEXAS.

IMPROVEMENT IN CHURNS.

Specification forming part of Letters Patent No. 131,623, dated September 24, 1872.

*To all whom it may concern:*

Be it known that we, WILLIAM P. MESSICK and HARVEY T. MESSICK, of Clarksville, in the county of Red River and State of Texas, have invented a new and Improved Churn, of which the following is a specification:

Figure 1 represents a side elevation, partly in section, of our improved churn. Fig. 2 is a top view of the same.

Similar letters of reference indicate corresponding parts.

This invention relates to a new churn mechanism whose parts can be easily taken apart or put together, and which operate in conjunction to rapidly reduce the milk to butter. The invention consists in constructing the dasher in two parts, which rotate in opposite directions, and in supplying to their shafts upper detachable ends hung in a slide to be conveniently thrown into and out of gear.

A in the drawing represents the churn-body, of slightly conical or circular form. B and C are the two dashers therein. The inner dasher B is secured to a vertical shaft, D, which passes through the cover of the churn and rests with its lower end on a step, $a$, at the bottom of the churn. The upper and outer dasher C is mounted upon a tubular shaft, E, which embraces the shaft D, as shown. Each dasher consists of an upper horizontal cross or plate, $b$, from which a series of vertical prismatic rods, $d\ d$, are suspended, which, when revolved in opposite directions, serve to thoroughly churn the milk and quickly convert it into butter. Above the churn-body is, in a stationary frame, F, a vertical slide, G, which can be let up or down at pleasure. In this slide are hung the upper continuations D' and E', respectively, of the shafts D and E, which, when the slide is let down, are joined to the said shafts by prismatic couplings, as indicated in Fig. 1. Pulleys $e$ and $f$, on the extension shafts D' E', serve to impart rotary motion thereto by belt-connection with a driving-pulley, H, one of the belts being crossed, the other not, to cause the dashers to revolve in opposite directions. The pulley H is mounted upon an arbor, $g$, which has its bearings in the frame F, and can be horizontally adjusted by a set-screw, $h$, to keep the belts in proper tension. Whenever the churn is to be opened or detached from the mechanism, the slide G is raised and the churn-cover removed, whereupon the dashers can be easily lifted out.

Having thus described our invention, we claim as new, and desire to secure by Letters Patent—

The dasher-shafts D E, arranged in combination with their extensions D' E', which hang in the vertical slide G, substantially as herein shown and described.

WILLIAM P. MESSICK.
HARVEY T. MESSICK.

Witnesses:
R. S. VAN WEY,
DAVID RAMEY.